(12) United States Patent
Crews et al.

(10) Patent No.: US 7,297,204 B2
(45) Date of Patent: Nov. 20, 2007

(54) WATER-IN-OIL BITUMINOUS DISPERSIONS AND METHODS FOR PRODUCING PAVING COMPOSITIONS FROM THE SAME

(75) Inventors: Everett Crews, Charleston, SC (US); Tom E. Girardeau, Mt. Pleasant, SC (US); Iain Jack, Goose Creek, SC (US)

(73) Assignee: MeadWestvaco Corporation, Glen Allen, VA (US)

( * ) Notice: Subject to any disclaimer, the term of this patent is extended or adjusted under 35 U.S.C. 154(b) by 32 days.

(21) Appl. No.: 11/391,146

(22) Filed: Mar. 28, 2006

(65) Prior Publication Data

US 2007/0082983 A1    Apr. 12, 2007

Related U.S. Application Data

(63) Continuation-in-part of application No. PCT/US2005/002916, filed on Jan. 27, 2005.

(60) Provisional application No. 60/545,713, filed on Feb. 18, 2004.

(51) Int. Cl.
*C09D 195/00* (2006.01)
*E01C 5/12* (2006.01)
*E01C 7/24* (2006.01)
*E01C 7/26* (2006.01)

(52) U.S. Cl. .......................... 106/277; 524/60; 524/61; 404/17; 404/34; 427/138

(58) Field of Classification Search ................ 106/277; 524/60, 61; 404/17, 34; 427/138
See application file for complete search history.

(56) References Cited

U.S. PATENT DOCUMENTS

| | | | | |
|---|---|---|---|---|
| 5,085,704 | A | * | 2/1992 | Schilling et al. ............ 106/277 |
| 5,743,950 | A | * | 4/1998 | Hendriks et al. ......... 106/281.1 |
| 2002/0170464 | A1 | * | 11/2002 | Larsen et al. ............ 106/273.1 |
| 2005/0135879 | A1 | * | 6/2005 | Grubba et al. ................ 404/75 |
| 2007/0060676 | A1 | * | 3/2007 | Reinke ........................ 524/59 |

* cited by examiner

*Primary Examiner*—David M Brunsman
(74) *Attorney, Agent, or Firm*—Terry B. McDaniel; Warunee Srisiri (57) ABSTRACT

There is provided a method for making bituminous compositions comprising water-in-oil bituminous dispersion and aggregate by the steps of: preparing a solvent-free, water-in-oil bituminous dispersion comprising: (1) bitumen, in an amount from about 75.0% to about 95.0% by total weight of the bitumen dispersion; (2) a surfactant in an amount from about 0.05% to about 2.0% by total weight of the bitumen dispersion; and (3) water in an amount to complete the water-in-oil bituminous dispersion, and producing the bituminous composition having a temperature from about 50° C. to about 120° C. by mixing: (1) the water-in-oil bituminous dispersion of step (A), having a temperature from about 75° C. to about 95° C., in an amount from about 2.0% to about 10.0% by total weight of the bituminous composition, and (2) aggregate, having a temperature from about 60° C. to about 140° C., in an amount from about 90.0% to about 98.0% by total weight of the bituminous composition.

34 Claims, 1 Drawing Sheet

WATER-IN-OIL BITUMINOUS DISPERSIONS AND METHODS FOR PRODUCING PAVING COMPOSITIONS FROM THE SAME

CROSS-REFERENCE TO RELATED APPLICATION

This application is a continuation-in-part of International Patent Application No. PCT/US2005/002916, filed Jan. 27, 2005, which claims priority from U.S. Provisional Application Ser. No. 60/545,713, filed Feb. 18, 2004, which are incorporated herein in its entirety by reference.

BACKGROUND OF THE INVENTION

1. Field of Invention

The invention relates to water-in-oil bitumen dispersions. More specifically, the invention relates to water-in-oil bitumen dispersions, in which the oil phase is one or more paving asphalts and to methods for making same.

2. Description of the Prior Art

Hot mix paving compositions consist principally of aggregate and bitumen generally made by heating aggregate to temperatures exceeding 300° F. (150° C.) to quantitatively remove both surface and pore-bound moisture. Bitumen is heated to temperatures typically exceeding 290° F. to lower the viscosity of the product and make it suitable for pumping through conventional liquid transfer equipment. The heated, water-free aggregate and bitumen are then mixed in either batch or continuous mixing equipment to produce the desired paving composition. These processing steps result in the paving composition typically exceeding 290° F. upon exiting the mixing equipment. This high-temperature paving composition is typically referred to by those skilled in the art as hot-mix asphalt ("HMA").

Elevated temperatures are needed in the production of HMA to ensure complete aggregate drying and to ensure that the bitumen-aggregate mixture has adequate fluidity to be processed easily through the hot-mix asphalt paving plant transfer equipment such as the buggy, belt, or slat conveyers used in silo storage systems. Additionally, bitumen-aggregate mixtures are produced at temperatures exceeding 290° F. to ensure that they will discharge uniformly from haul trucks, process easily through asphalt paver equipment, and compact to desired densities under compressive force of conventional, static, vibratory, or oscillatory steel and pneumatic compacting equipment.

U.S. Pat. No. 5,256,195 to Redelius (which is hereby incorporated by reference) teaches the use of anionic invert emulsions containing breaking agents in the aqueous phase of the water-in-oil emulsion in combination with slow-setting cationic emulsions as the main mixing and coating emulsion. These invert emulsions are not, however, created with bitumens suitable for construction of load-bearing pavements. Rather, they comprise chiefly low-viscosity oils, such as mineral oils and other solvents, or low-viscosity bitumens, such as bitumen flux. The use of cutter stocks in asphalt pavements results in decreases in the early compressive strength of compacted pavement. Dosages of cutter stocks, as little as 0.1% by weight of the emulsion, often decrease the compacted pavement compressive strength until such time as the cutter stock has evaporated into the atmosphere. Decreased compressive strength may result in deformation under traffic.

For ease of handling, conventional bitumen emulsions used in fast-, medium-, and slow-setting asphalt paving applications are oil-in-water emulsions exhibiting viscosities and flow characteristics suitable for pumping, mixing, and spraying. In conventional oil-in-water emulsions, the bitumen or oil phase is dispersed as stabilized droplets in a continuous phase of water. Conventional oil-in-water emulsions are, thus, dispersions of discrete bitumen droplets in water. These oil-in-water bitumen dispersions typically contain an oil phase comprising 50-75% bitumen by weight of the emulsion.

When using bitumens suitable for constructing load bearing pavements, it is not possible to exceed 75% bitumen (by weight of the finished emulsion) in the dispersed phase of a conventional oil-in-water bitumen dispersion. Unacceptable handling and transfer properties result from production of oil-in-water bitumen emulsions with over 75% bitumen (or "residue" as the non-aqueous portion of bitumen emulsions is commonly referred to by those skilled in the art). Raising temperatures to facilitate handling is not an option because the water phase of the oil-in-water emulsion would evaporate, leading to further increases in viscosity.

In contrast to oil-in-water bitumen emulsions water-in-oil bitumen dispersions consist of water dispersed in the "oil phase" of bitumen. The interface between the polar water and non-polar bitumen phases can be stabilized by the use of surface active agents, not known frequently in asphalt paving applications using conventional oil-in-water dispersions. Water-in-oil bitumen dispersions are characterized by dispersed water droplets within a continuous oil phase of bitumen. Thus, water-in-oil bitumen dispersions may be referred to as "inverted" water-in-oil emulsions, or simply "invert" emulsions for short. In water-in-oil bitumen dispersions, the dispersed water phase generally comprises less than 20% by weight of the water-in-oil emulsion.

If comprised of paving grade bitumen (either performance-graded bitumens specified by the Strategic Highway Research Program, viscosity-graded bitumens, or penetration graded bitumens), the resulting water-in-oil bitumen dispersion exhibits viscosity that prevents flow at temperatures below the boiling point of water. Poor handling and transfer properties resulting from high viscosity, thus, prevent the use of "invert" dispersions in the production of bituminous compositions for construction of load-bearing pavements using conventional hot-mix asphalt production and construction equipment. Plant engineering controls and liquid transfer equipment are not compatible with use of high-viscosity forms of bitumen liquids.

"Invert" water-in-oil bitumen dispersions made with conventional paving grade bitumens must be produced in pressure vessels to prohibit evaporation of water. Paving grade bitumens typically need to be heated to around 135° C. to fluidize sufficiently to process properly in conventional colloid mill equipment. Combination of 80 parts bitumen at 135° C. with 20 parts water leads to a finished invert emulsion exceeding 100° C. Without backpressure, boiling of the water occurs.

To overcome the limitations imposed by the viscosity of the paving grade bitumen, water-in-oil bitumen dispersions are typically produced with bitumens that have been diluted with bitumen-compatible solvents such as diesel, naphtha, gasoline, kerosene, biodiesel, waste oils, or other suitable bitumen-compatible diluent. Dilution allows reduction of the temperature of the oil phase during emulsion production (so that the water does not boil out of the finished product).

However, use of these bitumen-compatible solvents and diluents has undesirable consequences. Fugitive vapors in these solvents may pose worker health hazards or create air pollutants. Additionally, these solvents and diluents may leach into soils and groundwater supplies, causing undesired effects water and soil quality. Lastly, these solvents and diluents that remain in the bitumen in the finished, compacted pavement structure lead to a significant reduction in the stiffness of the pavement. Reduction in stiffness, in turn, leads to deformation in the pavement structure under the load of traffic. Thus, pavements containing solvents and diluents find only limited application on today's highways, being used primarily on rural, low-volume routes.

Hot mix paving compositions, based on paving grade bitumens and designed for high-traffic load-bearing asphalt pavements, are normally produced by mixing non-emulsified bitumen with aggregate at elevated temperatures (usually in excess of 150° C.). The two most common hot mix facilities, drum mix plants and batch plants, heat aggregate in a rotating kiln to extremely high temperatures to drive off all water adsorbed to the aggregate, as well as all water absorbed within the surface pores of the aggregate. As noted, quantitative removal of water is required to ensure that the finished hot mixture of aggregate and bitumen shows no moisture sensitivity in the finished pavement layer once it is transported, laid down, and compacted.

As described above, hot, dry aggregate produced in conventional hot mix operations is mixed with bitumen (which is previously liquefied by heating to temperatures far in excess of its melting point) to produce what is known in the industry as the "hot mix asphalt." Hot mix asphalts generally must be produced, laid down, and compacted at temperatures in excess of about 150° C., as the compactability of the hot mix asphalt depends on the temperature. If the mix cools, the asphalt viscosity increases and the mixture cannot be compacted to the design density (referred to as "air voids"). When a hot asphalt-aggregate mixture produced in this way cools to temperatures below about 100° C., the handling, placement, and compaction of the mixture become extremely difficult and design densities (air voids) cannot be realized. Failure to reach design densities results in deformation or rutting of the pavement layer in the wheel paths of vehicular traffic. Failure to reach design density may yield an overly porous pavement which is susceptible to moisture intrusion and moisture-related distress.

It is a general object of the present invention to disclose a method of producing water-in-oil bituminous dispersions.

Another object of the invention relates to water-in-oil bitumen dispersions, which comprise an oil phase consisting paving asphalts of the penetration-graded, viscosity-graded, and/or penetration-graded varieties substantially free of volatile solvents.

A further object of the invention relates to water-in-oil bitumen dispersions comprising an oil phase consisting of paving asphalts of the penetration-graded, viscosity-graded, and/or penetration-graded varieties substantially free of volatile solvents, and which are made using in-line mixing operations.

A still further object of the invention relates to water-in-oil bitumen dispersions, which comprise an oil phase consisting of paving asphalt of the penetration-graded, viscosity-graded, and/or penetration-graded varieties, and which are made using in-line mixing methods involving static and/or dynamic mechanical unit operations in fixed and/or mobile asphalt mix plants of the batch, continuous, and/or dual varieties to produce asphalt paving compositions suitable for use in construction of load-bearing asphalt pavements.

Yet another object of the invention relates to water-in-oil bitumen dispersions, which comprise an oil phase of paving asphalts of the penetration-graded, viscosity-graded, and/or penetration-graded varieties, and which exhibit controllable, temperature-dependent interfacial rheology resulting from the inclusion in the dispersion of specific surfactant packages.

A still further object of the present invention is to produce water-in-oil bituminous dispersions, using surfactants, which exhibit substantially complete aggregate coating, compact to required densities in the field, and which rapidly develop load-bearing strength.

A even further object of the present invention is to produce bituminous compositions, using water-in-oil bitumen dispersions made at very high bitumen residues which are suitable for use in paving applications and which are suitable for construction of a paved road.

BRIEF DESCRIPTION OF THE DRAWINGS

Other objects, features and advantages of the present invention will become apparent from the following detailed description taken in conjunction with the drawings in which.

SUMMARY OF THE INVENTION

The objects of this invention are met by a method for producing bituminous compositions suitable for use in paving applications, made by controlling temperature-dependent interfacial rheology in a broad range of solvent-free, very high-residue, invert or inverted water-in-oil bitumen dispersions containing paving-grade asphalts such as performance-graded bitumens. To produce the solvent-free water-in-oil bitumen dispersions in these paving compositions, surfactants are employed with structural characteristics that impart low interfacial viscosity, low Marangoni effect, and high interfacial bitumen solubility, at elevated temperatures (60 to 120° C.). The use of bitumens in these dispersions with solubility parameters comparable with those of the surfactant(s) is preferred but not required. The improved combination of surfactants, with structural attributes that impart improved control of interfacial stability and rheology in solvent-free, water-in-oil bitumen dispersions at elevated temperatures relative to ambient cold mix technologies and at reduced temperatures relative to hot mix technologies, leads to load-bearing road paving compositions with improved densification and accelerated strength development in the compacted state.

This invention provides a formulation of solvent-free, water-in-oil bitumen dispersions, which are based on performance-graded bitumens (and also on viscosity-graded bitumens and penetration-graded bitumens commonly used in production of load-bearing, high-traffic pavements) and which exhibit controllable, temperature-dependent interfacial rheology, and use of said emulsions to fully coat aggregate at temperatures typically between 60 and 120° C., thereby producing bituminous compositions suitable for the construction of load-bearing pavements that exhibit improved compaction to densities similar or superior to those achieved in high-temperature hot mix asphalt compositions and achieve cure rates that exceed those achieved with compacted, conventional cold emulsion-based paving compositions and that equal or exceed those of compacted, hot mix paving compositions.

When employed in paving applications, these bituminous compositions, which are both produced and then used in pavement construction at temperatures of 60 to 120C., develop adhesive strength and load-bearing strength properties at rates comparable to traditional hot mix paving compositions and at rates faster than traditional cold mix paving compositions.

DETAILED DESCRIPTION OF THE INVENTION

The present inventions now will be described more fully hereinafter, but not all embodiments of the invention are shown. Indeed, these inventions may be embodied in many different forms and should not be construed as limited to the embodiments set forth herein; rather, these embodiments are provided so that this disclosure will satisfy applicable legal requirements.

There is provided a method for producing bituminous compositions of the present invention comprising water-in-oil bitumen dispersion and aggregate. The water-in-oil bitumen dispersion is solvent-free and contains bitumen, a surfactant or combination of surfactants, and water in an amount to complete the invert water-in-bitumen emulsion. The properties of the bitumen meet specifications of performance-graded, viscosity-graded, or penetration-graded bitumens used in construction of load-bearing pavements. The properties of the aggregate meet specifications established by the appropriate transportation authorities as suitable for use in construction of load-bearing pavements. The bituminous composition is produced at a temperature from about 50° C. to about 120° C. by mixing:

1) the water-in-oil bitumen dispersion, having a temperature from about 75° C. to about 95° C., in an amount from about 2.0% to about 10.0% by total weight of the bituminous composition, and 2) aggregate, having a temperature from about 60° C. to about 140° C., in an amount from about 90.0% to about 98.0% by total weight of the bituminous composition.

In the present invention, from about 75% to about 95% (preferably from about 85% to about 95%) by total weight of the water-in-oil bitumen dispersion comprises at least one bitumen. In addition to bitumens that are suitable for use in the present invention, the invention includes modified bitumens, and combinations thereof. As used herein, the "bitumens" and "modified bitumens" are those which exhibit rheological properties that are appropriate for paving applications under specific climatic conditions, such as those which conform to the Strategic Highway Research Program (SHRP) pavement binder specifications. The bitumen component may be naturally occurring bitumens (such as Trinidad Lake asphalt and the like), naturally occurring bituminous materials such as gilsonite and gilsonite derivatives, or it may be derived from crude oil. Also petroleum pitches (such as asphalt) obtained by a cracking process and coal tar can be used as well as blends of bituminous materials. The bitumen may also conform to specifications of viscosity-graded and/or penetration-graded bitumens.

Any additive which is traditionally added to bitumen to produce a modified bitumen meeting performance-grade standards (such as SHRP) are suitable for use in this invention. Such additives include, but are not limited to, natural rubbers, synthetic rubbers, plastomers, thermoplastic resins, thermosetting resins, elastomers, and combinations thereof. Examples of these additives include styrene-butadiene-styrene (SBS), styrene-butadiene-rubber (SBR), polyisoprene, polybutylenes, butadiene-styrene rubbers, vinyl polymers, ethylene vinyl acetate, ethylene vinyl acetate derivatives, and the like. Bitumens used in process of the present invention may also contain recycled crumb rubber from recycled tires. It is preferred that the modified bitumen contain at least one member selected from the group consisting of styrene-butadiene-styrene, styrene-butadiene-rubber, sulfur-containing crosslinkers, acid modifiers such as tall oil acids, tall oil pitches, and phosphoric acid derivatives and combinations thereof. It is well within the ability of a skilled artisan to produce modified bitumen containing the noted additives.

Where desired, additional additives traditionally employed in the production of bitumen emulsions may be incorporated into the aqueous phase of the bitumen emulsion in order to adjust the characteristics of the finished mix. Suitable additives include styrene-butadiene-rubber latex, polyisoprene latex, salts, and the like. Such additives also include but are not limited to acid modifiers such as polyphosphoric acid, crude and distilled tall oil acids and tall oil pitches, and derivatives thereof, and wax modifiers such as Montan wax, beeswax, and Fisher-Tropsch waxes.

From about 0.05% to about 2.0% (preferably from about 0.1% to about 0.75%, and more preferably from about 0.08% to about 0.5%) by total weight of the bitumen emulsion of the present invention is comprised of at least one surfactant. Suitable surfactants include anionic types, amphoteric types, cationic types, nonionic types and combinations thereof.

The bitumen dispersions of this invention are preferably of the water-in-oil type; they consist of a dispersion of water droplets within a continuous phase of bitumen liquid. The water-in-oil bitumen dispersion is produced at the same facility as the bituminous paving composition. Equipment, which is suitable for making the water-in-oil bitumen dispersion, includes, but is not limited to the following types of mixing equipment: high-shear colloid mills, static in-line mixers, high-shear mixers, and high-shear nozzle devices.

The water-in-oil bitumen dispersion is produced at a temperature preferably but not limited to between 80 and 95° C. with said equipment and immediately after production injected into the mixing chamber, where it is mixed with aggregate (having a temperature between 60 and 140° C.) to yield the bituminous paving composition, having itself a temperature between 60 and 140° C. Other additives may be added with the aggregate. Such additives include, but are not limited to, mineral additives such as lime and cement, and fibrous additives such as cellulose, glass, and polymer fibers. Additives to the aggregate feed can also include reclaimed asphalt pavement materials.

Ionic surfactants which are suitable for use in the present invention include anionic surfactants, amphoteric surfactants, cationic surfactants, and combinations thereof. Suitable anionic surfactants include, but are not limited to, the following: saturated C-12 to C-24 (preferably C-16 to C-18) fatty acids, unsaturated C-12 to C-24 (preferably C-16 to C-18) fatty acids; unsaturated C-12 to C-24 (preferably C-16 to C-18) fatty acids modified with acrylic acid, maleic anhydride, fumaric acid, and/or other ene- and dieneophiles; natural resinous polymers (such as quebracho resins and the like); lignous polymers (such as tall oil lignin and the like); polyacrylic acid; polyacrylate derivatives; alkyl sulfonates, alkyl benzyl sulfonates, and alkyl sulfates; alkyl phosphonates, alkyl phosphates; phenolic resins; rosin acids, rosin acids modified with acrylic acid, maleic anhydride, fumaric acid, and/or other ene- and dieneophiles. As used herein, the term "anionic surfactants" includes the above-noted compounds and their derivatives.

As used herein the term "amphoteric surfactants" includes both mono-amphoteric and polyamphoteric surfactants.

Amphoteric surfactants which are suitable for use in the present invention include, but are not limited to, the following: C-12 to C-24 (preferably C-16 to C-18) fatty acids modified with acrylic acid, maleic anhydride, fumaric acid, and/or other ene- and dieneophiles and further reacted with polyethylene polyamines, lithium C-12 to C-24 alkyl amidopropyl halide methyl carboxylate betaines, sodium C-12 to C-24 alkyl amidopropyl halide methyl carboxylate betaines, potassium C-12 to C-24 alkyl amidopropyl halide methyl carboxylate betaines, lithium C-12 to C-24 alkyl amidopropyl halide phosphate betaines, sodium C-12 to C-24 alkyl amidopropyl halide phosphate betaines, potassium C-12 to C-24 alkyl amidopropyl halide phosphate betaines, lithium C-12 to C-24 alkyl amidopropyl halide sulphate betaines, sodium C-12 to C-24 alkyl amidopropyl halide sulphate betaines, potassium C-12 to C-24 alkyl amidopropyl halide sulphate betaines.

Cationic surfactants which are suitable for use in the present invention include, but are not limited to, the following: fatty imidoamines derived from C-12 to C-24 (preferably C-16 to C-18) fatty acids modified with maleic anhydride, fumaric acid, and/or other ene- and dieneophiles and further reacted with polyalkylenepolyamines; fatty amidoamines derived from C-12 to C-24 (preferably C-16 to C-18) fatty acids modified with acrylic acid, maleic anhydride, fumaric acid, and/or other ene- and dieneophiles and further reacted with polyalkylenepolyamines; saturated C-12 to C-24 alkyl monoamines, unsaturated C-12 to C-24 alkyl monoamines, saturated C-12 to C-24 alkyl polypropylenepolyamines, unsaturated C-12 to C-24 alkyl polypropylenepolyamines, saturated C-12 to C-24 alkyl monoamines modified by reaction with ethylene oxide and/or propylene oxide to give polyoxyethylene derivatives, unsaturated C-12 to C-24 alkyl monoamines modified by reaction with ethylene oxide and/or propylene oxide to give polyoxyethylene derivatives, saturated C-12 to C-24 alkyl polypropylenepolyamines modified by reaction with ethylene oxide and/or propylene oxide to give polyoxyethylene derivatives, unsaturated C-12 to C-24 alkyl polypropylenepolyamines modified by reaction with ethylene oxide and/or propylene oxide to give polyoxyethylene derivatives, saturated C-12 to C-24 alkyl aryl monoamines, unsaturated C-12 to C-24 alkyl aryl monoamines, saturated C-12 to C-24 alkyl aryl polypropylenepolyamines, unsaturated C-12 to C-24 alkyl aryl polypropylenepolyamines, C-12 to C-24 quaternary amines, amine derivatives of tannins, amine derivatives of phenolic resins, amine derivatives of lignins, amine-modified polyacrylates; and combinations thereof. It is preferred that the cationic emulsifier be a member selected from the group consisting of saturated C-12 to C-24 alkyl monoamines, unsaturated C-12 to C-24 alkyl monoamines, saturated C-12 to C-24 alkyl polypropylenepolyamines, unsaturated C-12 to C-24 alkyl polypropylenepolyamines, and combinations thereof. It is further preferred that the cationic emulsifier be a blend of at least one member selected from the group consisting of saturated and unsaturated C-12 to C-24 alkyl monoamines with at least one member selected from the group consisting of saturated and unsaturated C-12 to C-24 alkyl polypropylenepolyamines. As used herein, the term "cationic surfactants" includes the above-noted compounds and their derivatives.

Nonionic surfactants which are suitable for use in the present invention include, but are not limited to, the following: alkylaryl polyethylene oxide and polypropylene oxide derivatives, polyethylene oxide and polypropylene oxide derivatives of branched, linear, and cyclic alkanols, sorbitan esters, mono- and polysaccharide derivatives, protein stabilizers such as casein and albumin, polyethoxylated and polypropoxylated derivatives of the anionic, amphoteric, and cationic surfactants mentioned above, and mechanical stabilizers such as the phyllosilicate bentonite and montmorillonite clays.

The surfactants of the present invention not only convey the high-temperature shear-stability needed for mixing (and subsequent compacting) of the bituminous compositions, but also impart a low interfacial tension between the bitumen film and aggregate (so that a strong adhesive bond is maintained and water damage to the pavement is prevented).

Surfactant formulations are chosen to control such emulsion properties as the interfacial viscosity, Marangoni effect, and interfacial bitumen solubility at the elevated temperature of the present invention (i.e., about 50° C. to about 120° C.) and concurrently at low surfactant dosages. Surfactant dosages likewise are chosen to impart the target interfacial properties in the finished emulsion. Additionally, high surfactant dosages are avoided as they are costly, contribute to low rates of compressive strength development, and increase moisture sensitivity in the finished pavement.

It is preferred that the water-in-oil bitumen dispersion be solvent-free. Environmental concerns have driven the reduction, up to elimination, of organic solvents from paving bitumen emulsions. However, for technological reasons total elimination has not been available in all paving applications prior to the availability of the present invention. Thus, in certain districts the term "solvent-free" is defined to include a minor portion of organic solvents. For example, "solvent-free" has at one time been defined in the state of Pennsylvania to include up to 4% organic solvents. For the purposes of this invention, therefore, where desired the invert water-in-bitumen dispersion may contain at least one solvent (such as naphtha, kerosene, diesel, flux, and the like) at a level less than that needed to facilitate either: 1) the mixing of the bituminous composition at ambient temperature to yield fully-coated aggregate, or 2) the compaction of the bituminous composition at ambient temperatures. Where added, it is preferred in the present invention that the level of solvent be less than about 1.0% by total weight of the bitumen dispersion. As used herein, the term "ambient temperatures" means an environmental temperature of less than about 40° C.

The bituminous compositions of the present invention are produced at a temperature in the range of about 50° C. to about 120° C. (preferably in the range of about 55° C. to about 100° C., and more preferably in the range of about 60° C. to about 95° C.) by mixing from about 2.0% to about 10% by total weight of the bituminous composition of the water-in-oil bitumen dispersion at a temperature in the range of about 75° C. to about 95° C. (preferably in the range of about 85° C. to about 95° C.), and from about 90% to about 98% by total weight of the bituminous composition of aggregate at a temperature in the range of about 60° C. to about 140° C. (preferably in the range of about 60° C. to about 120° C.).

Aggregate used in paving materials and road construction, road rehabilitation, road repair, and road maintenance are derived from natural and synthetic sources. As in any construction process, aggregates are selected for asphalt paving applications based on a number of criteria, including physical properties, compatibility with the bitumen to be used in the construction process, availability, and ability to provide a finished pavement that meets the performance specifications of the pavement layer for the traffic projected over the design life of the project. Among the aggregate properties that are key to successful road construction is gradation, which refers to the percent of aggregate particles of a given size. For most load-bearing asphalt pavements, three gradations are common: dense-graded, gap-graded, and open-graded. Dense-graded aggregate exhibit the greatest mineral surface area (per unit of aggregate). Open-graded aggregate largely consist of a single, large-sized (e.g., around 0.375 to 1.0 inch) stone with very low levels (typically less than about two percent of the total aggregate) of fines (material less than 0.25 inch) or filler (mineral material less than 0.075 mm). Gap graded aggregate fall between dense-graded and open-graded classes. Reclaimed asphalt pavement (RAP) material generally reflects the gradation of the pavement from which the reclaimed material was obtained. If the original pavement was a dense-graded mix, the RAP generally will also be dense graded, although the filler content is generally observed to be lower than the design limits of the origin aggregate specifications.

Any aggregate which is traditionally employed in the production of bituminous paving compositions is suitable for use in the present invention, including dense-graded aggregate, gap-graded aggregate, open-graded aggregate, stone-matrix asphalt, recycled asphalt paving, and mixtures thereof. Aggregate which is not fully dried can be employed in the present invention.

Where used in paving applications, it is preferred that the bituminous compositions of the present invention be applied to the surface to be paved at a temperature in the range of about 50° C. to about 120° C. (preferably in the range of about 85° C. to about 100° C., and more preferably in the range of about 85° C. to about 95° C.).

Once applied to the surface to be paved, the bituminous compositions of the present invention can be compacted as desired using any of the compaction methods traditionally employed for paving applications. It is preferred that the applied bituminous compositions be compacted to an air void content comparable to hot mix pavement compositions made at temperatures exceeding 140° C. and having substantially equivalent aggregate gradation and bitumen content.

It is also further preferred that the applied bituminous compositions be compacted to develop load-bearing strength at a rate comparable to hot mix pavement compositions made at temperatures exceeding 140° C. and having substantially equivalent aggregate gradation and bitumen content.

The method of the present invention is suitable for use in thin lift overlay paving applications. Thin lift overlays is a maintenance paving technique that traditionally involves the placement of a thin lift of a bituminous composition produced according to standard hot-mix procedures at temperatures normally exceeding 165° C. and applied at corresponding temperatures in the field to an existing, damaged pavement surface. The current thin lift technology using hot-mix bituminous compositions commonly suffers from two chief deficiencies. The hot bituminous compositions tend to cool quickly, making it difficult to extend (i.e., spread) onto the existing pavement surface (at ambient temperatures) that is in need of repair. This rapid cooling of the thin lift of hot bituminous material can also result in relatively poor compaction. The problems that arise in construction (e.g., extension, spreading, and compaction) due to rapid cooling can be aggravated by the use of polymer-modified bitumens. Polymer-modified bitumens have viscosities higher than unmodified bitumens at a given temperature. Thus, hot-mix bituminous compositions (mixtures with aggregate) made with polymer-modified bitumens are more viscous than equivalent bituminous compositions made with unmodified bitumen at a given construction temperature. As a consequence of this increased viscosity and increased resistance to flow, a thin lift bituminous composition made with polymer-modified bitumen can exhibit even greater problems in handling and construction as the material cools rapidly.

Where desired, the methods and bituminous compositions of the present invention can be employed in the production of bituminous paving blocks. In this technology, water-in-oil bitumen dispersion and aggregate are mixed to form a bituminous composition that is cast in molds, compacted, and allowed to cure. The cured blocks (or bricks) are used to construct pavements. Where used in the production of bituminous paving blocks, it is preferred that the bituminous compositions of the present invention be cast in the mold and compacted at a temperature in the range of about 50° C. to about 120° C. (preferably in the range of about 80° C. to about 100° C.).

Due to the enhanced compaction (leading to higher density and higher strength) and accelerated cure rates (leading to increased production rates and improved manufacturing economics) exhibited by the bituminous compositions of the present invention, the employment of the methods and bituminous compositions of the present invention offers improvements over the construction of these blocks using traditional cold mix paving compositions.

Where desired, the methods and bituminous dispersions of the present invention can be used in in-situ production of bituminous compositions. Such in-situ operations include on-site recycling operations such as hot in-place recycling where an aged, distressed pavement may be heated with a variety of portable heater units, scarified, and re-combined with bituminous material to create a rejuvenated paving composition. The rejuvenated paving composition is immediately extended over the width of the traffic lane and compacted to create a rejuvenate pavement riding surface.

Bituminous compositions of the present invention should be maintained at a temperature in the range of about 50° C. to about 120° C. (preferably in the range of about 80° C. to about 100° C.) for the period of time between the production of the bituminous compositions and their use in paving applications. It is preferred that the bituminous compositions be maintained at these temperatures in closed systems (such as relatively large stockpiles, storage silos, covered transport vehicles, and the like) to prevent evaporation of moisture.

Equipment traditionally utilized in the production of asphalt emulsion mixes includes pug mills of either batch or continuous variety. Pug mills impart high shear to the emulsion as it is ground with coarse aggregate, fines, and filler. A common problem associated with such high-shear events has been a coarsening of the emulsion. These mixers are high shear mixers as aggregate (which is heated in the drum or batch mixer to the specified process temperatures) tumbles down the inclined drum and as bitumen emulsion is sprayed onto the warm aggregate. The emulsion treated aggregate also tumbles downward through the drum mixer. The interior wall of most drum mixers is lined with vanes that repeatedly catch the mix, lift it up as the drum rotates, and deposit it back to the bottom of the drum. Drum and batch plants are capable of throughput of many hundred tons of paving material per hour. While it is preferred to employ drum mixers or batch mixers in the production of the bituminous compositions of the present invention, any method of mixing the water-in-oil bitumen dispersion and aggregate traditionally utilized in the production of paving compositions can be used.

The surfactant formulations described herein impart high-temperature Theological properties to the solvent-free, invert water-in-bitumen emulsion, which in turn stabilize the emulsion against the mechanical stresses imparted on the emulsion by the mechanical action of mixing with aggregate at elevated temperatures. These mechanical and shear stresses have commonly caused a coarsening of the emulsion with most traditional emulsifier formulations, leading to a reduction in the degree of aggregate coating and an increase in the viscosity of the mix, with the latter resulting in poor densification of the paving composition during compaction. Poor densification during compaction can result in a number of pavement distress problems (such as rutting, pot-hole formation, and raveling). While the use of high surfactant dosages can mitigate this coarsening, such dosages can also retard the development of compressive strength, an undesirable outcome.

The interfacial rheology of the disperse-phase water droplets in the bitumen dispersions of the present invention directly influences the behavior of the emulsions when mixed at elevated temperatures with heated aggregate. The surface rheology at the water-oil interface is, in turn, controlled by the structure and chemistry of the surfactant(s). Surfactant structure and chemistry affect the energy required to disperse the surfactant at the interface. Surfactant structure and chemistry determine the shear stability of the water-in-oil bitumen dispersion against rupture under high-temperature shear conditions, such as those exhibited during mixing of emulsions and aggregate at temperatures above ambient. Surfactant structure and packing affect the interfacial fluidity or viscosity. Further, proper choice of surfactant structure affects the magnitude of the effect on the interfacial viscosity.

The following examples are provided to further illustrate the present invention and are not to be construed as limiting the invention in any manner.

In the following examples, the bituminous compositions of bitumen emulsion and aggregate were either mixed with an automated bucket mixer or by hand. The mixtures of bitumen emulsion and aggregate were compacted immediately after preparation while the mixtures were at production temperatures. A Strategic Highway Research Program (SHRP) gyratory compactor (commercially available from Pine Instruments) was used to compact the bituminous compositions into pills at a gyratory angle of 1.25° and a ram pressure of 600 kPa using 30 gyrations. Immediately after compaction, the bituminous composition pills were placed in a 25° C. oven for curing. After curing, the pills were evaluated for compressive strength (i.e., Marshall stability). A stabilometer (commercially available from Pine Instruments) was used to measure the compressive strength of the compacted specimens.

The aggregate used in Examples 1-3 was crushed granite conforming to gradation and property specifications for a dense-graded, ½-inch nominal paving mixture commonly used for production of pavement wearing courses. All aggregate samples were oven-dried (110° C.) before usage to remove moisture.

EXAMPLE 1

The asphalt used was performance-graded asphalt, PG67-22. Other viscosity-graded, penetration-graded, and performance-graded asphalts are suitable for this type of invert emulsion production. The aggregate used was dense-graded aggregate complying with Superpave aggregate qualities and performance specifications.

Bituminous compositions were prepared by the following procedure. To 15 parts water containing alkyl polyamine surfactant at pH 2.5 and a temperature of 85C. was added 85 parts PG 64-22 bitumen heated to 135C. The bitumen was added slowly so that the temperature of the resulting invert water-in-bitumen dispersion was maintained below 100C. Roughly 70 parts of the above invert water-in-bitumen dispersion were immediately added to roughly 1000 parts dense-graded granite aggregate conforming to gradation and property specifications for ½-inch nominal wearing course paving aggregate and heated to 120C. The composition was mixed 60 seconds to produce bituminous compositions containing about 5.6% bitumen by total weight of the graded aggregate.

The resulting bitumen compositions (having a temperature in the range of about 80° C. to about 95° C.) were added immediately to a 100-mm diameter gyratory compaction mold, which had been preheated to 80° C.-95° C. The bitumen compositions were then compacted using 30 gyrations of a SHRP Pine gyratory compactor at 600 kPa pressure and a gyration angle of 1.25°.

The compacted bituminous compositions were placed in a 25° C. oven and allowed to cure for twenty-four hours. After curing, the physical and performance properties of the compacted and cured bituminous compositions were measured. Strength properties were those expected for an identically-formulated hot mix asphalt paving composition.

EXAMPLES 2-4

The asphalt used in Examples 2-4 was performance-graded asphalt, PG67-22. Other viscosity-graded, penetration-graded, and performance-graded asphalts are suitable for this type of invert emulsion production. The aggregate used in Examples 2-4 was dense-graded aggregate complying with Superpave aggregate qualities and performance specifications.

Examples 2 and 3 used high-shear homogenizers. High-shear homogenizers can be fitted with shear heads which allow production of invert asphalt emulsions at atmospheric pressures and temperatures below 100° C. A speed of 16,000 rpm was employed with the serrated shear head used in these experiments. Since these experiments were conducted at atmospheric pressure, the asphalt temperatures were maintained at levels that would prohibit the vaporization of water from the soap solution. Typically, these temperatures were 200-212° F. Use of a pressure-rated closed system for mixing would allow the use of higher asphalt temperatures under pressure without the loss of water vapor. Target asphalt content of the water-in-oil bituminous dispersion produced in Examples 2 and 3 were 80 to 90% asphalt by weight of the finished water-in-oil bituminous dispersion.

Soap solutions were made by dissolving the appropriate emulsifier package in water and adjusting to various pH levels. Emulsifier dosages in the soap solutions were adjusted such that their content in the finished dispersion would be 0.1 to 0.5%. Other dosages are appropriate as are other emulsifier packages. Soap pH was adjusted by addition of concentrated hydrochloric acid. Soap solutions were heated to roughly 185° F. prior to making the water-in-oil bituminous dispersion.

The procedure in Examples 2 and 3 involved the following steps. Asphalt was added to a metal vessel secured to a ring stand and heated on a hot plate to the target temperature of 200-212° F. The high-shear mixer with serrated shear head was engaged at 16,000 rpm. To the heated asphalt with mixing was added the soap solution. The resulting invert emulsion was sampled for solids (asphalt content) and for was added to dense-graded paving grade aggregate. The aggregate had a temperature of 140-250° F.

Example 2. The emulsifier package was a blend of one or more polyethylene polyamine amidoamine condensates of modified fatty acid and with one or more members of the class of long-chain fatty polypropylene polyamines. Members of these classes were discussed in PCT application Ser. No. PCT/US2005/002916.

To make the final total emulsifier dosage roughly 0.3% by weight of the finished invert dispersion, the concentration of emulsifier in the soap was roughly 1.5%. For example, 20 grams of heated soap solution would contain roughly 0.3 grams of emulsifier package. Thus, 100 grams of invert dispersion was comprised of roughly 19.7 grams water, 80 grams asphalt, and 0.3 grams of the above emulsifier package.

Soap solution pH was adjusted to 2.0 by addition of concentrated hydrochloric acid and was heated to 185° C. prior to addition to the asphalt under shear. Once the required amount of soap solution was added to the sheared asphalt, the high-shear mixer was turned off.

The warm mix asphalt paving composition was made, as in conventional hot-mix asphalt laboratory production, by adding the above-made water-in-oil bituminous dispersion to pre-heated aggregate in a bucket mixer. For example, 60 grams of invert emulsion were added to 1000 grams of pre-heated aggregate. Activation of the bucket mixer allowed coating of the aggregate by the inert emulsion. The resulting mix had a temperature of roughly 140-180° F.

The resulting mix was suitable for producing compacted warm mix specimens.

Example 3. An emulsifier chemical package containing solely an polyethylene polyamine amidoamine condensate of fatty acid was used to make a soap solution as in Example 1. The soap solution resulting from this emulsifier package was also adjusted to pH 2.0 with hydrochloric acid. Production of the invert dispersion was achieved as in Example 2 by adding the 185° F. soap solution to 200° F. PG67-22 asphalt heated to 200° F. and under mixing in the high-shear mixer. To make the warm asphalt paving composition, 60 grams of the resulting water-in-oil bituminous dispersion was added to pre-heated aggregate with mixing in a conventional, one-gallon bucket mixer.

The resulting mix was not suitable for producing compacted warm mix specimens as the coating of the aggregate was incomplete. Dense-graded paving compositions must exhibit complete aggregate coating.

Example 3. A 316-SS, static, tube, in-line mixer was affixed via a T-junction to the outlet sides of separate soap and asphalt pumps. Soap solutions were treated as those described above in Examples 2 and 3 and were co-fed with hot asphalt to the in-line mixer. The soap and asphalt feed lines, as well as the in-line mixer, were heat-traced to maintain elevated temperatures. A meta-stable invert dispersion was discharged from the outlet side of the in-line mixer. The resulting meta-stable invert was fed directly to a bucket mixer containing pre-heated aggregate to produce a warm asphalt paving composition.

EXAMPLES 5-7

The aggregate used in Examples 5-7 was crushed limestone having a gradation shown in Table I.

Figure 1:
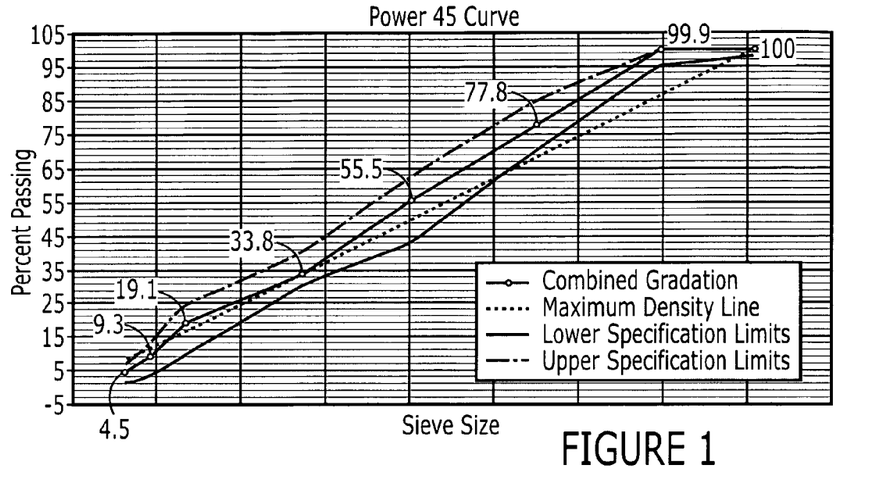
FIG. 1 is a 0.45-power curve graph showing the gradation of the materials used in Examples 4-6.

Materials used in these examples included a Venezuelan bitumen having Superpave grading of PG64-22 and a crushed limestone aggregate having a ⅜-inch Nominal Maximum Aggregate Size (NMAS) following the gradation given in TABLE I and the 0.45-power curve graph shown in FIG. 1.

TABLE I

Crushed Limestone Gradatiion

| Sieve size | Percent Passing |
| --- | --- |
| ⅞ inches | 100 |
| ⅝ inches | 99.9 |
| ⅜ inches | 77.8 |
| No. 4 | 55.5 |
| No. 10 | 33.8 |
| No. 40 | 19.1 |
| No. 80 | 9.3 |
| No. 200 | 4.5 |

Figure 2:
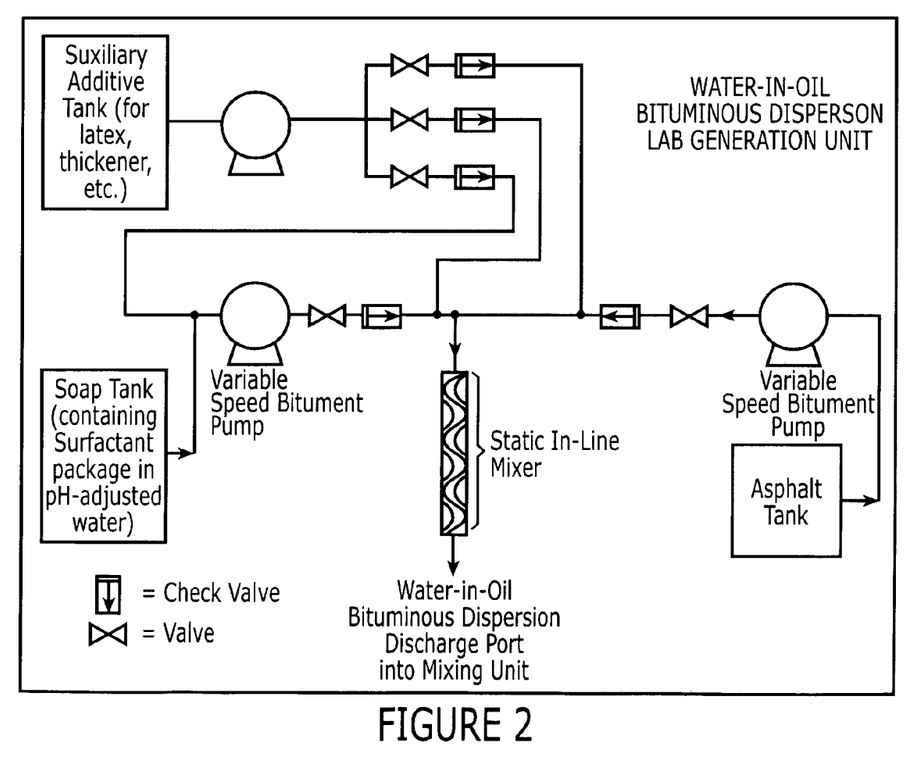
FIG. 2 is a schematic drawing of the static, in-line mixing unit used to conduct the experiments of the present invention.

The water-in-oil bituminous dispersion in these experiments were created using a static, in-line mixing unit shown in the schematic drawing in FIG. 2. Following the teachings of this invention, soap solutions consisting of a surfactant package dissolved in water and adjusted to pH 2.0-3.0 were prepared. The surfactant package in the soap solution was a mixture of roughly 1:1:2 parts respectively of alkyl monoamine, alkyl propylene polyamine, and a polyethylenepolyamine condensate of tall oil fatty acid fortified through Diels-Alder condensation reaction. The surfactant package comprised between 3.33 to 10% of the soap solution.

In EXAMPLES 5-7 the soap solution and bitumen were fed using separate pumping and delivery systems to the static in-line mixer at a ratio of 15:85, 10:90, and 5:95, respectively. Thus, the resulting water-in-oil bituminous dispersion comprised between 85% and 95% bitumen and 15% and 5% water (also containing said surfactant package and mineral acid for pH adjustment). The surfactant package in all three experiments was 0.5% by weight of the finished water-in-oil bituminous dispersion. In these Examples, the resulting water-in-oil bituminous dispersion was discharged directly to a mechanical bucket mixer mixing unit (well known in the asphalt mix industry) which contained aggregate pre-heated to the temperature indicated in TABLE II. Mixes prepared in the mixing unit were transferred to compaction molds and compacted using the SHRP Pine gyratory compactor, with N-initial, N-design, and N-max equal to 8, 100, and 160 gyrations, respectively. Densities of compacted mixes were measured as were strengths an N-max. Examples 5 and 6 differed in the starting temperature of the aggregate and resulting mix temperatures. In Example 5, the aggregate temperature was 80° C. with a resulting mix temperature of 85° C. In Example 6, the aggregate temperature was 120° C., with a resulting mix temperature of 107° C. The volumetric properties (densities) and TSR values of paving compositions made with the water-in-oil bituminous dispersions were comparable to properties of paving compositions of the Hot Mix Asphalt (HMA) Control, which was made via conventional procedures.

EXAMPLE 7

Example 7 utilized the same formulation and process conditions as Example 4. However, in Example 7, styrene-butadiene latex commonly used in the asphalt paving industry was added to the soap solution in the quantity indicated in TABLE II. The resulting water-in-oil bituminous dispersion contained polymer-modified bitumen. The volumetric properties were again comparable to those of the Hot-Mix Asphalt (HMA) control.

TABLE II

| EXPERIMENT | HMA CONTROL | 3 | 4 | 5 | 6 | 7 |
|---|---|---|---|---|---|---|
| Soap Temp. (° C.) | — | 30-40 | 30-40 | 30-40 | 30-40 | 30-40 |
| Surfactant Package (% w/w Soap) | — | 3.3 | 3.3 | 6.6 | 9.9 | 3.3 |
| Styrene-Butadiene Latex (% w/w Soap) | — | 0 | 0 | 0 | 0 | 11.3 |
| Ratio of Soap Feed to Bitumen Feed | — | 15:85 | 15:85 | 10:90 | 5:95 | 15:85 |
| Bitumen Temp. (° C.) | 160 | 130-140 | 130-140 | 130-140 | 130-140 | 130-140 |
| Aggregate Temp. (° C.) | 160 | 80 | 120 | 100 | 100 | 100 |
| Mix Temp. (° C.) | 160 | 85 | 107 | 100 | 107 | 100 |
| Mold Temp (° C.) | 150 | 80 | 95 | 95 | 95 | 95 |
| Compacted Mix Density at N-initial[a] | 88.4 | 88.9 | 88.6 ± 0.2 | 89.0 ± 0.0 | 88.3 ± 0.0 | 88.7 |
| Compacted Mix Density at N-des[a] | 95.1 | 96.6 | 96.0 ± 0.1 | 96.5 ± 0.4 | 95.8 ± 0.2 | 96.1 |
| Compacted Mix Density at N-max[a] | 96.2 | 97.6 | 97.1 ± 0.1 | 97.6 ± 0.5 | 96.9 ± 0.3 | 97.0 |
| Strength (psi) at N-max | 192 | 175 | 166 | 202 | 182 | 200 |
| Dry Strength (psi) (AASHTO T-283) | 138.2 | — | 100.4 | — | — | — |
| Wet Strength (psi) (AASHTO T-283) | 99.8 | — | 75.3 | — | — | — |
| TSR | 72.0 | — | 75.0 | — | — | — |

[a]Density as a percent of Gmm (maximum mix specific gravity).

Many modifications and variations of the present invention will be apparent to one of ordinary skill in the art in light of the above teachings. It is therefore understood that the scope of the invention is not to be limited by the foregoing description, but rather is to be defined by the claims appended hereto.

What is claimed is:

1. A method for producing a bituminous composition comprising water-in-oil bituminous dispersion and aggregate by the steps of:
   (A) preparing a solvent-free, water-in-oil bituminous dispersion comprising:
      (1) bitumen, in an amount from about 75.0% to about 95.0% by total weight of the bitumen dispersion,
      (2) a surfactant in an amount from about 0.05% to about 2.0% by total weight of the bitumen dispersion, and
      (3) water in an amount to complete the water-in-oil bituminous dispersion, and
   (B) producing the bituminous composition having a temperature from about 50° C. to about 120° C. by mixing:
      (1) the water-in-oil bituminous dispersion of step (A), having a temperature from about 75° C. to about 95° C., in an amount from about 2.0% to about 10.0% by total weight of the bituminous composition, and
      (2) aggregate, having a temperature from about 60° C. to about 140° C., in an amount from about 90.0% to about 98.0% by total weight of the bituminous composition.

2. The method of claim 1 wherein said water-in-oil bituminous dispersion contains at least one bitumen selected from the group consisting of naturally occurring bitumens, naturally occurring bituminous materials, bitumens from crude oil, bitumens from petroleum pitches, bitumens from coal tar, and combinations thereof.

3. The method of claim 1 wherein said water-in-oil bituminous dispersion contains at least one bitumen selected from the group consisting of polymer-modified bitumens, rubberized bitumens, acid-modified bitumen, wax-modified bitumen, and combinations thereof.

4. The method of claim 3 wherein said polymer-modified bitumen contains at least one member selected from the group consisting of natural rubbers, synthetic rubbers, plastomers, thermoplastic resins, thermosetting resins, elastomers, and combinations thereof.

5. The method of claim 1 wherein said water-in-oil bituminous dispersion contains bitumen modified with at least one member selected from the group consisting of styrene-butadiene-styrene, styrene-butadiene-rubber, polyisoprene, polybutylenes, butadiene-styrene rubbers, vinyl polymers, ethylene vinyl acetate, sulfur-containing crosslinkers, acid modifiers and combinations thereof.

6. The method of claim 1 wherein said water-in-oil bituminous dispersion contains from about 0.08% to about 0.5% by total weight of the dispersion of at least one ionic surfactant.

7. The method of claim 1 wherein said water-in-oil bituminous dispersion contains from about 0.1% to about 0.75% by total weight of said dispersion of at least one ionic surfactant.

8. The method of claim 1 wherein said surfactant is a member selected from the group consisting of anionic surfactants, anionic surfactants, amphoteric surfactants, cationic surfactants, and combinations thereof and in combination with nonionic surfactants.

9. The method of claim 8 wherein said cationic surfactant is a member selected from the group consisting of fatty imidoamines derived from C-12 to C-24 fatty acids modified with maleic anhydride, fumaric acid, and/or other ene- and dieneophiles and further reacted with polyalkylenepolyamines; fatty amidoamines derived from C-12 to C-24 fatty acids modified with acrylic acid, maleic anhydride, fumaric acid, and/or other ene- and dieneophiles and further reacted with polyalkylenepolyamines; saturated C-12 to C-24 alkyl monoamines; unsaturated C-12 to C-24 alkyl monoamines; saturated C-12 to C-24 alkyl polypropylene polyamines; unsaturated C-12 to C-24 alkyl polypropylene polyamines; saturated C-12 to C-24 alkyl monoamines modified by reaction with ethylene oxide and/or propylene oxide to give polyoxyethylene derivatives; unsaturated C-12 to C-24 alkyl monoamines modified by reaction with ethylene oxide and/or propylene oxide to give polyoxyethylene derivatives; saturated C-12 to C-24 alkyl polypropylene polyamines modified by reaction with ethylene oxide and/or propylene oxide to give polyoxyethylene derivatives; unsaturated C-12 to C-24 alkyl polypropylene polyamines modified by reaction with ethylene oxide and/or propylene oxide to give polyoxyethylene derivatives; saturated C-12 to C-24 alkyl aryl monoamines; unsaturated C-12 to C-24 alkyl aryl monoamines; saturated C-12 to C-24 alkyl aryl polypropylene polyamines; unsaturated C-12 to C-24 alkyl aryl polypropylene polyamines; C-12 to C-24 quaternary amines; amine derivatives of tannins; amine derivatives of phenol resins; amine derivatives of lignins, amine-modified polyacrylates; and combinations thereof.

10. The method of claim 8 wherein said anionic surfactant is a member selected from the group consisting of saturated C-12 to C-24 fatty acids, unsaturated C-12 to C-24 fatty acids, unsaturated C-12 to C-24 fatty acids modified with acrylic acid, maleic anhydride, fumaric acid, and/or other ene- and dieneophiles; natural resinous polymers, lignous polymers, polyacrylic acid, polyacrylate derivatives, alkyl sulfonates, alkyl benzyl sulfonates, ethoxylated alkyl benzyl sulfonates, alkyl sulfates, ethoxylated alkyl sufates, alkyl phosphonates, ethoxylated alkyl phosphonates, alkyl phosphates, ethoxylated alkyl phosphates, phenolic resins, rosin acids, rosin acids modified with acrylic acid, maleic anhydride, fumaric acid, and/or other ene- and dieneophiles, and ethoxylated derivatives thereof.

11. The method of claim 8 wherein said amphoteric surfactant is a member selected from the group consisting of C-12 to C-24 fatty acids modified with acrylic acid, maleic anhydride, fumaric acid, and/or other ene- and dieneophiles and further reacted with polyethylene polyamines, lithium C-12 to C-24 alkyl amidopropyl halide methyl carboxylate betaines, sodium C-12 to C-24 alkyl amidopropyl halide methyl carboxylate betaines, potassium C-12 to C-24 alkyl amidopropyl halide methyl carboxylate betaines, lithium C-12 to C-24 alkyl amidopropyl halide phosphate betaines, sodium C-12 to C-24 alkyl amidopropyl halide phosphate betaines, potassium C-12 to C-24 alkyl amidopropyl halide phosphate betaines, lithium C-12 to C-24 alkyl amidopropyl halide sulphate betaines, sodium C-12 to C-24 alkyl amidopropyl halide sulphate betaines, and potassium C-12 to C-24 alkyl amidopropyl halide sulphate betaines, and ethoxylated and propoxylated derivatives thereof.

12. The method of claim 8 wherein said nonionic surfactant is a member selected from the group consisting of alkylaryl polyethylene oxide; polypropylene oxide; polyethylene oxide derivatives of branched, linear, and cyclic alkanols; polypropylene oxide derivatives of branched, linear, and cyclic alkanols; sorbitan esters; monosaccharides; polysaccharides; protein stabilizers; polyethoxylated derivatives of the anionic, amphoteric, and cationic surfactants; polypropoxylated derivatives of the anionic, amphoteric, and cationic surfactants; mechanical stabilizers; and combinations thereof.

13. The method of claim 1 wherein said water-in-oil bituminous dispersion is produced using high-shear mixing operations.

14. The method of claim 13 wherein said high-shear mixing operations comprises at least one member selected from the group consisting of high-shear colloid mills, high-shear static mixers, high-shear roto-mixers.

15. The method of claim 1 wherein said water-in-oil bituminous dispersion is delivered immediately after production directly into a mixing chamber of a stationary or mobile hot-mix asphalt production facility.

16. The method of claim 15 wherein said mixing chamber comprises at least one member selected from the group consisting of drum mixers, pug-mill batch mixers, and dual mixers.

17. The method of claim 1 wherein said bituminous composition is produced having a temperature in the range of about 55° C. to about 100° C.

18. The method of claim 1 wherein said bituminous composition is produced having a temperature in the range of about 80° C. to about 95° C.

19. The method of claim 1 wherein said water-in-oil bituminous dispersion of step (B) (1) has a temperature in the range of about 75° C. to about 90° C.

20. The method of claim 1 wherein said aggregate of step (B) (2) has a temperature in the range of about 60° C. to about 120° C.

21. The method of claim 1 wherein said aggregate is a member selected from the group consisting of dense-graded aggregate, gap-graded aggregate, open-graded, stone-matrix aggregate, reclaimed asphalt pavement aggregate, reclaimed roofing shingles, and combinations thereof.

22. A method of paving a surface comprising a step of applying a bituminous composition onto said surface, wherein said bituminous composition comprising:
   (A) water-in-oil bituminous dispersion in an amount from about 2% to about 10% by total weight of the bituminous composition, wherein the dispersion includes:
      (1) bitumen in an amount from about 75.0% to about 95.0% by total weight of the bitumen dispersion,
      (2) a surfactant in an amount from about 0.05% to about 2.0% by total weight of the bitumen dispersion, and
      (3) water in an amount to complete the water-in-oil bituminous dispersion; and
   (B) aggregate in an amount from about 90.0% to about 98.0% by total weight of the bituminous composition.

23. The method of claim 22 wherein said bituminous composition is applied to said surface at a temperature range of about 50° C. to about 120° C.

24. The method of claim 22 wherein said bituminous composition is applied to said surface at a temperature range of about 55° C. to about 100° C.

25. The method of claim 22 wherein said bituminous composition is applied to said surface at a temperature range of about 60° C. to about 80° C.

26. A paving block including bituminous composition, wherein said bituminous composition comprising:
   (A) water-in-oil bituminous dispersion in an amount from about 2% to about 10% by total weight of the bituminous composition, wherein the dispersion includes:
      (1) bitumen in an amount from about 75.0% to about 95.0% by weight of the bitumen dispersion,
      (2) a surfactant in an amount from about 0.05% to about 2.0% by total weight of the bitumen dispersion, and
      (3) water in an amount to complete the water-in-oil bituminous dispersion; and
   (B) aggregate in an amount from about 90.0% to about 98.0% by total weight of the bituminous composition.

27. A paved substrate comprising at least one layer of a bituminous composition comprising:
(A) a solvent-free water-in-oil bituminous dispersion comprising bitumen, in an amount from about 75.0% to about 99.0% by total weight of the bituminous emulsion, an emulsifier in an amount of from about 0.05% to about 2.0% by total weight of the bitumen emulsion, and water in an amount to complete the bitumen emulsion,
  in an amount from about 2.0% to about 10.0% by total weight of the bituminous composition; and
(B) aggregate in an amount from about 90.0% to about 98.0% by total weight of the bituminous composition.

28. The paved substrate of claim 27 wherein said water-in-oil bituminous dispersion contains at least one bitumen selected from the group consisting of naturally occurring bitumens, naturally occurring bituminous materials, bitumens from crude oil, bitumens from petroleum pitches, bitumens from coal tar, and combinations thereof.

29. The paved substrate of claim 27 wherein said water-in-oil bituminous dispersion contains at least one bitumen modified with a member selected from the group consisting of natural rubbers, synthetic rubbers, plastomers, thermoplastic resins, thermosetting resins, elastomers, recycled tire rubber, and combinations thereof.

30. The paved substrate of claim 27 wherein said water-in-oil bituminous dispersion contains at least one bitumen modified with a member selected from the group consisting of styrene-butadiene-styrene, styrene-butadiene-rubber, polyisoprene, polybutylenes, butadiene-styrene rubbers, vinyl polymers, ethylene vinyl acetate, sulfur-containing crosslinkers, acid modifiers, and combinations thereof.

31. The paved substrate of claim 27 wherein said bitumen dispersion contains from about 0.08% to about 0.5% by total weight of the dispersion of at least one surfactant.

32. The paved substrate of claim 27 wherein said bitumen dispersion contains from about 0.1% to about 0.75% by total weight of said dispersion of at least one surfactant.

33. The paved substrate of claim 27 wherein said emulsifier is a member selected from the group consisting of anionic surfactants, amphoteric surfactants, cationic surfactants, nonionic surfactants, and combinations thereof.

34. The bituminous composition comprising:
(A) water-in-oil bituminous dispersion in an amount from about 2% to about 10% by total weight of the bituminous composition, wherein the dispersion includes:
  (1) bitumen in an amount from about 75.0% to about 95.0% by weight of the bitumen dispersion,
  (2) a surfactant in an amount from about 0.05% to about 2.0% by total weight of the bitumen dispersion, and
  (3) water in an amount to complete the water-in-oil bituminous dispersion; and
(B) aggregate in an amount from about 90.0% to about 98.0% by total weight of the bituminous composition.

* * * * *